Feb. 17, 1953 S. B. HAWKINS 2,628,847
VEHICLE FOR TRANSPORTING VELOCIPEDES
Filed Oct. 27, 1948

INVENTOR.
Sara B. Hawkins
BY Jennings & Carter
ATTORNEYS

Patented Feb. 17, 1953

2,628,847

UNITED STATES PATENT OFFICE 2,628,847

VEHICLE FOR TRANSPORTING VELOCIPEDES

Sara B. Hawkins, Tampa, Fla.

Application October 27, 1948, Serial No. 56,713

3 Claims. (Cl. 280—49)

My present invention relates to a hand drawn vehicle especially adapted for transporting a child's velocipede such as a tricycle and having means for mounting the velocipede thereon in such manner that a child may ride the velocipede and pedal the same, thus simulating forward movement of the velocipede, while the actual movement is under control of the person in charge of the vehicle.

More specifically, my invention contemplates a vehicle of the character designated having mounted on the frame or load carrying deck thereof a roller bed on which the front wheel of the velocipede rests, thus permitting the front wheel to rotate as the child pedals, together with suitable means to removably secure the velocipede to the deck of the vehicle.

A further object of my invention is to provide a vehicle of the character designated which embodies a generally flat deck narrow enough at its rear end to permit the rear wheels of the velocipede to overhang the sides thereof, whereby the rear of the velocipede is supported with the usual cross axle or cross frame of the same resting on the narrow end of the deck, and with its front wheel resting on the roller bed, together with a strap or the like for removably securing the velocipede to the deck of the vehicle.

A vehicle illustrating the features of my invention is shown in the accompanying drawings forming a part of this application in which.

Figure 1:
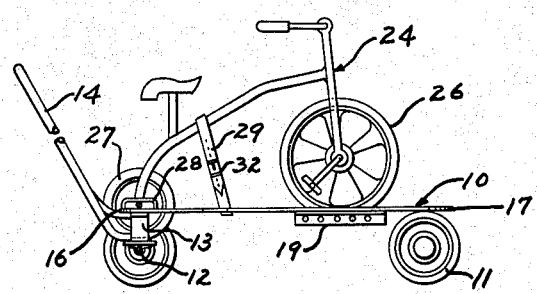
Fig. 1 is a side elevational view of my improved vehicle, partly broken away and in section, and showing a velocipede in place thereon.
Figure 2:
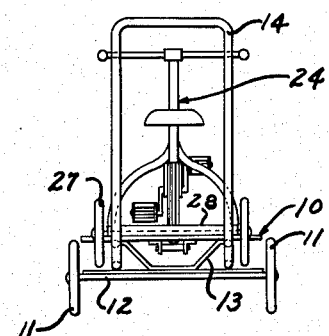
Fig. 2 is a rear elevational view.
Figure 3:
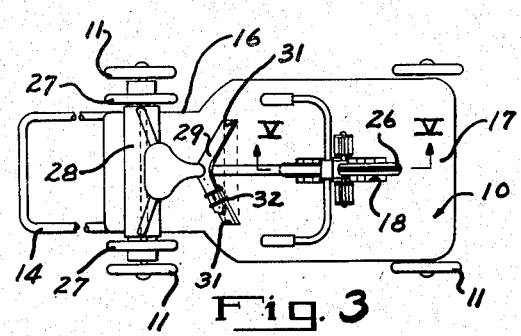
Fig. 3 is a plan view partly broken away.
Figure 4:
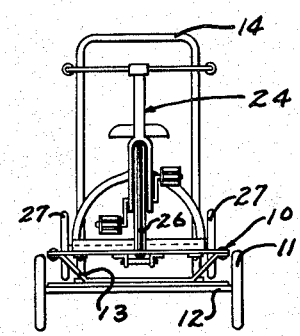
Fig. 4 is a front elevational view.
Figure 5:
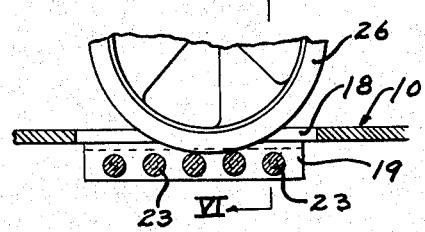
Fig. 5 is a detail sectional view taken generally along line V—V of Fig. 3 and drawn to an enlarged scale; and, Fig. 6 is a detail sectional view taken generally along line VI—VI of Fig. 5.
Figure 6:
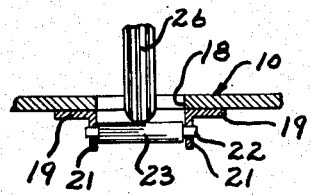

Referring now to the drawings for a better understanding of my invention, my improved vehicle comprises a flat frame or deck 10 supported on wheels 11. The wheels 11 may be rotatably mounted on axles 12, and the deck 10 may be raised above the axles by means of U-shaped brackets 13. At the rear of the vehicle is a handle 14 by means of which the same may be pushed or pulled. The deck 10 is narrower at its rear end as indicated at 16 than at the forward end 17.

Adjacent the forward end 17 I provide in the deck 10 a longitudinally extending slot 18. Beneath the deck 10, and on either side of the slot 18, I provide a channel 19 having a plurality of openings 21 therein for receiving the reduced ends 22 of a plurality of rollers 23. The rollers 23 are relatively closely spaced, and are rotatably journalled in the angles 19.

In use, the velocipede 24 is placed with the front wheel 26 thereof in the slot 18, and resting on the rollers 23. The rear wheels 27 of the velocipede overhang the narrow end 16 of the deck, and the axle or cross frame 28 of the velocipede rests on the deck. The velocipede is now secured in place by means of a strap 29 passing through suitable openings 31 in the deck, and provided with a buckle 32. The slot 18 is of sufficient width to freely pass the wheel 26 whereby a child mounted on the velocipede may pedal the same. The child is thus entertained while the person in charge of the vehicle moves the same by the handle 14. When desired, the strap 29 may be quickly released and the velocipede lifted off the vehicle for use in the normal way.

It is to be noted that the elongated slot and the narrow end of the frame 16 permits my improved vehicle to take velocipedes having different lengths of wheel base. Likewise, since the wheels 27 of the velocipede overhang the sides of the narrow end of the deck, the velocipede is securely anchored in place by the single strap 29. While not essential to the functioning of my improved vehicle, I preferably make the handle 14 rigid with the remainder of the framework of the vehicle whereby the front wheels 11 may be raised by pushing downwardly on the upper end of the handle, thereby to aid in moving the vehicle over curbs and similar obstructions.

From the foregoing it will be apparent that I have devised an improved vehicle for transporting a child's velocipede which is simple and economical of construction, and in which various sizes of velocipedes may be transported thereon in such manner that a child may entertain itself by pedaling the velocipede and yet be under control of the person in charge of the vehicle. Likewise it will be apparent that the velocipede is easily and quickly attached to and detached from the vehicle, and that no structural changes in the velocipede are necessary in mounting the same.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. For use in transporting a velocipede of the type having two rear wheels and a single front wheel, a deck, supporting wheels for the deck, there being a longitudinally extending narrow slot in the deck of a width rotatably receiving the periphery of the front wheel of the velocipede and restraining said front wheel against transverse movement relative to the deck, a roller bed beneath the slot on which the front wheel is adapted to be rotatably supported, and releasable means on the vehicle deck to secure the velocipede to the deck with its front wheel in said slot and resting on said roller bed.

2. For use in transporting a velocipede of the type having a pair of rear wheels and a single front wheel, a deck, supporting wheels for the deck, there being a narrow longitudinally extending slot in the deck adjacent the forward end thereof of a width rotatably receiving the periphery of the front wheel of the velocipede and restraining said front wheel against transverse movement relative to the deck, a plurality of closely spaced rollers beneath the deck extending transversely of the slot on which the front wheel of the velocipede is adapted to be rotatably supported, and a releasable connector on the deck for securing the velocipede to the deck with the front wheel thereof in said slot and resting on said rollers.

3. For use in transporting a velocipede of the type having a pair of opposed rear wheels and a single front wheel, a generally flat deck sufficiently narrow at its rear end for the rear wheels of the velocipede to overhang the sides thereof, there being an elongated longitudinally extending slot located on the longitudinal center line of the vehicle deck adjacent the forward end thereof and of a width to freely pass the periphery of the front wheel, a roller bed beneath the slot for rotatably supporting the front wheel of the velocipede, a strap secured to the deck for removably securing the velocipede to the deck with its front wheel in the slot and resting on the roller bed, and a handle rigidly fixed to and upstanding from the rear of the vehicle.

SARA B. HAWKINS.

REFERENCES CITED

The following references are of record in the file of this patent:

UNITED STATES PATENTS

| Number | Name | Date |
|---|---|---|
| 330,430 | Seiler | Nov. 17, 1885 |
| 581,835 | Sturgis | May 4, 1897 |
| 642,919 | Nott | Feb. 6, 1900 |
| 1,569,971 | Gilliani | Jan. 19, 1926 |
| 1,598,413 | Armstrong | Aug. 31, 1926 |
| 1,706,253 | Raymond | Mar. 19, 1929 |
| 1,706,267 | Van De Mark et al. | Mar. 19, 1929 |